Patented July 16, 1940

2,208,305

UNITED STATES PATENT OFFICE 2,208,305

RUBBERLIKE PRODUCT

Harvey G. Kittredge, Dayton, Ohio, assignor to The Kay & Ess Chemical Corporation, Dayton, Ohio, a corporation of Delaware No Drawing. Application January 6, 1937, Serial No. 119,311

4 Claims. (Cl. 260—22)

My invention relates to a rubberlike product and method of making it.

It is my object to provide a rubberlike product that is elastic, resilient and capable of being used as a substitute for rubber, in rubber paints and finishes, and which is inert to oils, greases and certain acids and alkalis.

It is my object to utilize a heretofore useless by-product as one of the elements in the manufacture of my new product.

It is my object to utilize the polymers produced by the long heating of vegetable oils, such as tung oil, oiticica oil, perilla oil, linseed, soya, cottonseed and the like, either with or without a catalyst to hasten polymerization. These polymers have been long considered of no value, and in the use of these oils, particularly tung, oiticica and perilla in connection with the making of varnishes, it has been customary to take steps to prevent the polymers of such oils occurring, as the gelatinous nature of these polymers are useless for any useful purpose.

It is my object to provide a reaction product of a polymer of a vegetable oil and a polyhydric alcohol and to secure a liquid or plastic that is easily thereafter vulcanized as natural rubber is vulcanized. My product being liquid or plastic, is easily incorporated in rubber or with reinforcing materials, or as a coating for textiles, metals and the like, upon which it can be baked.

Heretofore, rubber substitutes have been difficult of application because of their plastic or solid nature requiring expensive milling and other handling in connection with their manufacture or with their mixture with natural rubber.

The particular object of my invention is to carry the oil change to a solid or semi-solid, depending on the type of the oil. In other words, it is my object to carry the polymerization to substantially the ultimate stage, which, in the case of China-wood oil or tung oil, is a relatively stiff, gelatinous polymer, while the polymers of oiticica and perilla are somewhat softer.

Heretofore this substantially complete polymer, if accidentally secured, was thought useless and every effort was made to avoid it. It is the object of my invention to use it for the purposes hereinafter described.

PRODUCTION OF THE REACTION PRODUCT

I have utilized the polymers of tung oil, oiticica oil and perilla oil, but any one of the polymers of vegetable oils I believe are adaptable for the practice of this invention.

Example 1

For instance, I have combined 100 grams of the polymer of tung oil and 35 grams of glycerol. This mixture was heated at a temperature between 410 degrees and 450 degrees Fahrenheit. The heating was continued until all of the glycerol and tung oil polymers were combined. The resulting product is a reddish material that is viscous in its physical character.

Example 2

One hundred eleven grams of phthalic anhydride and 46 grams of glycerol were heated one-half hour at 410 degrees Fahrenheit. To this product was then added 290 grams of the combination of oiticica oil polymer or other vegetable oil polymer and glycerol. The heating was continued at 410 degrees Fahrenheit until clear, held at this temperature for an additional hour, then the temperature was raised to 500 degrees Fahrenheit, and then the mass was allowed to cool. The resulting product is resilient and elastic.

The resiliency and elasticity can be varied between wide limits, depending upon the amount of the vegetable oil-polymer-glyceride that is added. By the addition of a small percentage of sulphur of approximately 3 per cent, the rubberlike character of the mass is appreciably increased. It may be stretched, and upon release, shrink substantially to its original size. Tung oil and perilla oil polymers may be substituted for the oiticica oil polymers in this example.

VULCANIZATION

I find that upon adding suitable vulcanizing, accelerating and filler agents to the viscous liquid which is the resulting reaction product of the wood oil polymers with glycerol, I am able to secure a product which has the characteristics of rubber, which is elastic and resilient, which may be compressed and returned to its original shape, has good cohesion, and which is resistant to superficial oxidation and is inert to many of the acids and alkalis, oils and greases that affect adversely natural rubber.

The exact character of the resulting product depends upon the vulcanizing agents, accelerators and deoxidants employed, as well as upon the nature of the fillers, such as zinc oxide, carbon black, zinc sulphide and other pigments.

For instance:

Example 3

One hundred grams of the reaction product of the polymers of vegetable oil and glycerol mixed with three or more grams of sulphur and heated for several minutes results in the rubberlike compound described herein.

One of the advantages of this product is the absence of free sulphur after vulcanization. It can be employed in mixing with natural rubber without any disadvantage of having free sulphur in the mixture, which is the present disadvantage of many substitute rubberlike compounds now being used in the art.

I have found that this reaction product of vegetable oil polymers with glycerol is an effective plasticizer for cellulose acetate and nitrate lacquers.

*Example 4*

A stiff elastic and resilient product is produced as follows:

Thirty-five grams of a combined polymer of a vegetable oil such as either China-wood oil, oiticica oil, perilla oil and glycerol and 6 to 12 grams maleic acid or phthalic acid or anhydride, or succinic acid.

The foregoing is heated at 365 degrees F. until the mass begins to get relatively heavy, then at 280 degrees F. for two hours. The resulting product is a dark brown resilient and elastic mass that can be stretched and returned to its original size and shape. It is inert to oils, greases and to such acids as hydrochloric, dilute nitric and such alkalis as caustic soda and potash.

When it is desired to mix the reaction products described herein directly with rubber or with a synthetic rubberlike composition such as polymerized chloroprene, olefine polysulfide or with one of the glycerol phthalate resins, this can be done by using from 10 to 90 per cent of the reaction product of this invention with rubber or synthetic rubber. By reason of the liquid or plastic nature of my reaction products, it is possible to mill such a product with the rubber or synthetic rubber without difficulty. It gives to the product resulting that tack and adhesion which I have found desirable in this connection.

After the mixture, the rubber or synthetic rubber can be vulcanized in the usual manner.

Any one of the following accelerators may be used when the vulcanization of the product covered by this application is carried out, such as zinc dimethyldithiocarbamate, lead dimethyldithiocarbamate, mercaptobenzothiazole and benzothiazyl disulfide.

The vulcanizing agents referred to herein may be any one of several, such as sulphur.

This application is a continuation in part of my application, Ser. No. 78,486, filed May 7, 1936, Patent No. 2,111,427.

It will be understood that I desire to comprehend within my invention such modifications as may be necessary to adapt it to varying conditions and uses.

Having thus fully described my invention, what I claim as new and desire to secure by Letters Patent is:

1. A rubberlike product comprising a vulcanized mixture of olefine polysulfide and a reaction product of glycerol phthalate with a polymer of vegetable oil which has been substantially completely heat polymerized to a gelatinous state and combined with glycerol.

2. A rubberlike product comprising a vulcanized mixture of polymerized chloroprene and a reaction product of glycerol phthalate with a polymer of vegetable oil which has been substantially completely heat polymerized to a gelatinous state and combined with glycerol.

3. A rubberlike product obtained by reacting glycerol phthalate with a polymer of a vegetable oil substantially completely heat polymerized to the gelatinous stage and combined with glycerol, adding sulphur and vulcanizing the mixture to a resilient mass.

4. A rubberlike product comprising a vegetable oil polymer which has been substantially completely heat polymerized to the gelatinous stage and combined with glycerol, reacted with glycerol phthalate and the mixture vulcanized to a resilient mass.

HARVEY G. KITTREDGE.